US011626930B2

United States Patent
Li et al.

(10) Patent No.: US 11,626,930 B2
(45) Date of Patent: Apr. 11, 2023

(54) POLARIZATION RECOVERY APPARATUS AND METHOD THEREOF AND OPTICAL RECEIVER

(71) Applicant: FUJITSU LIMITED, Kawasaki (JP)

(72) Inventors: Jingnan Li, Beijing (CN); Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/564,726

(22) Filed: Dec. 29, 2021

(65) Prior Publication Data
US 2022/0255630 A1  Aug. 11, 2022

(30) Foreign Application Priority Data
Feb. 5, 2021  (CN) .......................... 202110159242.5

(51) Int. Cl.
*H04B 10/06*  (2006.01)
*H04B 10/61*  (2013.01)

(52) U.S. Cl.
CPC .................. *H04B 10/6162* (2013.01)

(58) Field of Classification Search
CPC  H04B 10/6162; H04B 10/6166; H04B 10/40; H04B 10/6971; H04B 10/2569; H04B 10/2572; H04J 14/06
USPC ....... 398/202, 204, 205, 206, 207, 208, 209, 398/135, 136, 158, 159, 65, 152, 33, 38, 398/137, 138
See application file for complete search history.

(56) References Cited

U.S. PATENT DOCUMENTS

| 8,121,480 | B2 | 2/2012 | Szafraniec et al. |
| 10,541,757 | B2 * | 1/2020 | Maeda ............. H04B 10/07951 |
| 2012/0076491 | A1 * | 3/2012 | Yan ..................... H04B 10/6162 398/25 |
| 2012/0275797 | A1 * | 11/2012 | Li .......................... H04B 10/66 398/152 |
| 2013/0163988 | A1 | 6/2013 | Krongold et al. |
| 2020/0295843 | A1 | 9/2020 | Su et al. |
| 2020/0382235 | A1 | 12/2020 | Matsuda et al. |

FOREIGN PATENT DOCUMENTS

| CN | 101645739 A | 2/2010 |
| CN | 111052641 A | 4/2020 |
| CN | 111698026 A | 9/2020 |

OTHER PUBLICATIONS

Guo Zhongyi et al., Advances on theory and application of polarization information propagation(Invited), Infrared and Laser Engineering, vol. 49 No. 6, Jun. 2020.
B. Szafraniec, B. Nebendahl and T. Marshall, "Polarization demultiplexing in Stokes space," Optics Express, vol. 18, No. 17, pp. 17928-17939, Aug. 16, 2010.
J. M. N. and N. P. A., "Adaptive 3-D Stokes Space-Based Polarization Demultiplexing Algorithm," Journal of Lightwave of Technol., vol. 32, No. 19, pp. 3290-3298, 2014.

* cited by examiner

*Primary Examiner* — Hanh Phan
(74) *Attorney, Agent, or Firm* — Staas & Halsey LLP

(57) ABSTRACT

A polarization recovery apparatus, a method thereof and an optical receiver. The method includes: performing adaptive equalization processing and polarization recovery on a received signal, wherein a polarization state of the received signal, after the adaptive equalization processing and polarization recovery being performed, is aligned with a principal axis of polarization of an optical receiver.

11 Claims, 9 Drawing Sheets

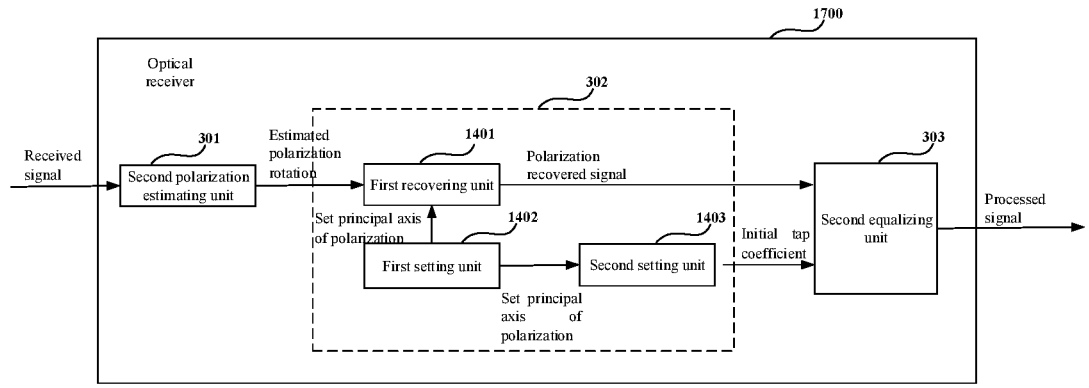
FIG. 17
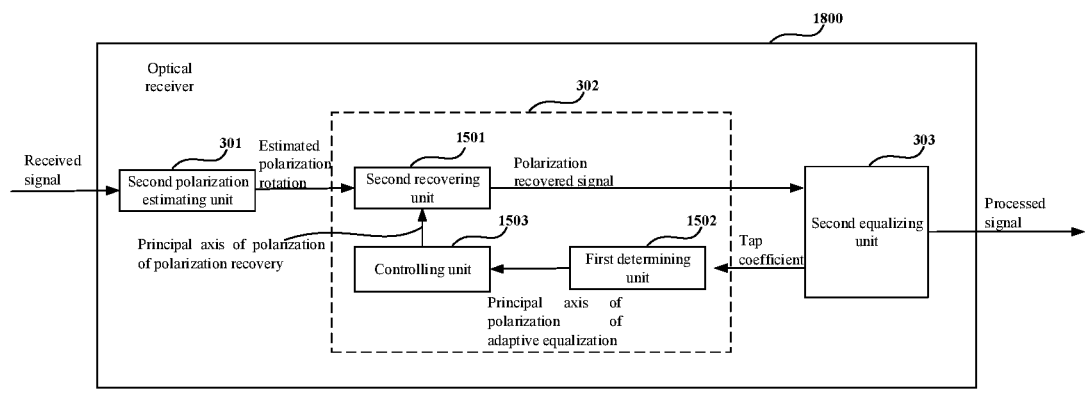
FIG. 18
1901
Adaptive equalization processing and polarization recovery is performed on a received signal; wherein a polarization state of the received signal after being performed adaptive equalization processing and polarization recovery is aligned with a principal axis of polarization of an optical receiver
FIG. 19

US 11,626,930 B2

POLARIZATION RECOVERY APPARATUS AND METHOD THEREOF AND OPTICAL RECEIVER

CROSS-REFERENCE TO RELATED APPLICATIONS

This application is based on and hereby claims priority to Chinese Application No. 202110159242.5, filed Feb. 5, 2021, in the State Intellectual Property Office of China, the disclosure of which is incorporated herein by reference.

TECHNICAL FIELD

This disclosure relates to the field of communication technologies.

BACKGROUND

Coherent optical communication systems take an important role in communication transmission networks due to their huge transmission bandwidths, great potentials for expansion, extremely low transmission loss, and low costs. In coherent optical communication systems, polarization multiplexing techniques may increase communication capacities.

Currently, for coherent optical receivers, adaptive equalization (AEQ) is usually used to achieve polarization demultiplexing. A commonly-used AEQ algorithms is a constant modulus algorithm (CMA). Polarization demultiplexing may be realized in a Stokes space by recovering a normal vector, without being affected by frequency offsets and phase noises.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a polarization recovery apparatus, the apparatus including: a processor configured to perform adaptive equalization processing and polarization recovery on a received signal; wherein a polarization state of the received signal, after the adaptive equalization processing and polarization recovery being performed, is aligned with a principal axis of polarization of an optical receiver.

According to an embodiment of this disclosure, there is provided an optical receiver, including the apparatus for polarization recovery.

According to an embodiment of this disclosure, there is provided a polarization recovery method, the method including: performing adaptive equalization processing and polarization recovery on a received signal; wherein a polarization state of the received signal, after the adaptive equalization processing and polarization recovery being performed, is aligned with a principal axis of polarization of an optical receiver.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 17 is another block diagram of the systematic structure of the optical receiver according to an embodiment of this disclosure;

FIG. 18 is a further block diagram of the systematic structure of the optical receiver according to an embodiment of this disclosure; and FIG. 19 is a schematic diagram of the polarization recovery method according to an embodiment of this disclosure.

DETAILED DESCRIPTION

Figure 1:
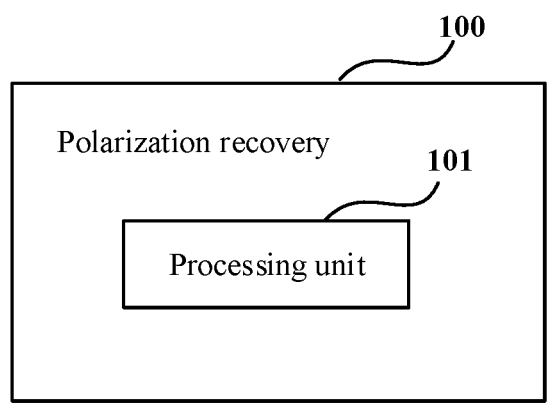
FIG. 1 is schematic diagram of the polarization recovery apparatus according to an embodiment of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that in a case where polarization mode dispersion (PMD) exists in an optical communication system, a pure polarization demultiplexing method in a Stokes space is unable to handle a PMD effect. In order to realize the polarization demultiplexing under PMD, a scheme of joint processing of Stokes space polarization demultiplexing and AEQ needs to be adopted. In the scheme of joint processing, there exists interaction of a polarization demultiplexing module and an AEQ module, which makes a polarization state of a jointly-processed received signal unable to be aligned with a principal axis of polarization of an optical receiver.

In order to solve at least one of the above problems, embodiments of this disclosure provide a polarization recovery apparatus and method thereof and an optical receiver, in which in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

An advantage of the embodiments of this disclosure exists in that in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

Embodiment 1

The embodiment of this disclosure provides a polarization recovery apparatus. For example, the apparatus is provided at an optical receiver end of an optical communication system. The apparatus may be integrated into an optical receiver, or may be provided as a separate apparatus.

FIG. 1 is schematic diagram of the polarization recovery apparatus of Embodiment 1 of this disclosure. As shown in FIG. 1, a polarization recovery apparatus 100 includes: a processing unit 101 configured to perform adaptive equalization processing and polarization recovery on a received signal.

According to an embodiment of the polarization recovery apparatus, a polarization state of the received signal after adaptive equalization processing and polarization recovery are performed is aligned with a principal axis of polarization of an optical receiver.

In this way, in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

In the embodiment of this disclosure, at the optical receiver end, in a case of joint processing by a polarization demultiplexing module and an AEQ module, the received signal may be adaptively equalized first, and then performed polarization recovery, or the received signal may be performed polarization recovery first, and then adaptively equalized.

The two cases shall be explained respectively below.

Figure 2:
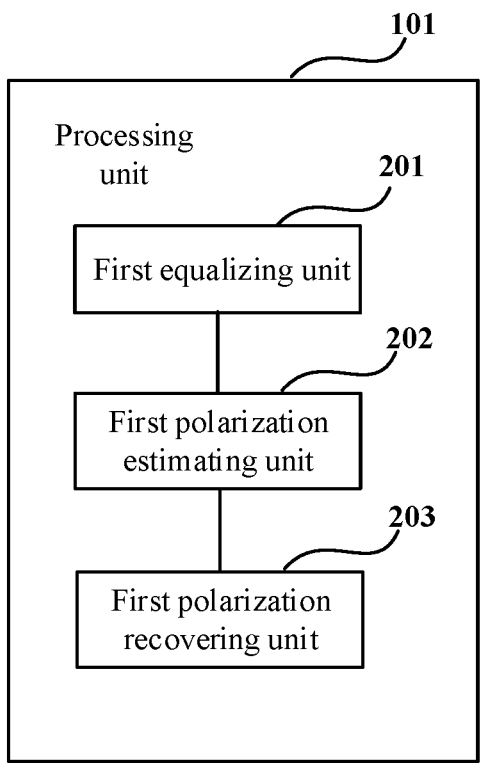
FIG. 2 is a schematic diagram of the processing unit according to an embodiment of this disclosure.

FIG. 2 is a schematic diagram of the processing unit of Embodiment 1 of this disclosure. As shown in FIG. 2, the processing unit 101 includes:

a first equalizing unit 201 configured to perform adaptive equalization processing on the received signal to obtain an adaptive equalization processed signal;

a first polarization estimating unit 202 configured to perform polarization estimation according to the adaptive equalization processed signal to obtain estimated polarization rotation; and a first polarization recovering unit 203 configured to perform polarization recovery according to the estimated polarization rotation, wherein in performing the polarization recovery, the polarization state of the received signal, after adaptive equalization processing being performed, is aligned with the principal axis of polarization of the optical receiver.

In the embodiment of this disclosure, the first equalizing unit 201 may perform adaptive equalization processing on the received signal by using an existing method, that is, the first equalizing unit 201 may use an existing AEQ module.

In the embodiment of this disclosure, the first polarization estimating unit 202 performs polarization estimation according to the adaptive equalization processed signal to obtain the estimated polarization rotation. An existing method, or a method described in the embodiment of this disclosure, may be used for the polarization estimation, which shall be described in detail later.

In the embodiment of this disclosure, the first polarization recovering unit 203 performs polarization recovery on the adaptive equalization processed signal, and in the process of performing the polarization recovery, controls a principal axis of polarization recovery, and aligns the polarization state of the received signal, after adaptive equalization processing being performed, with the principal axis of polarization of the optical receiver.

In this disclosure, the principal axis of polarization of the optical receiver refers to a principal axis of polarization of a device in the optical receiver performing other processing on the received signal after the polarization recovery apparatus 100, such as a principal axis of polarization of a digital signal processing device after the polarization recovery apparatus 100.

Figure 3:
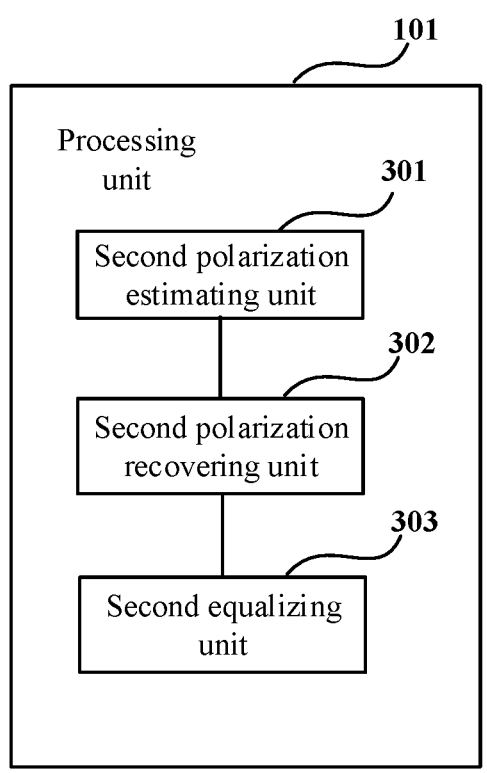
FIG. 3 is another schematic diagram of the processing unit according to an embodiment of this disclosure.

FIG. 3 is another schematic diagram of the processing unit of Embodiment 1 of this disclosure. As shown in FIG. 3, the processing unit 101 includes:

a second polarization estimating unit 301 configured to perform polarization estimation according to the received signal to obtain estimated polarization rotation;

a second polarization recovering unit 302 configured to perform polarization recovery on the received signal according to the estimated polarization rotation to obtained a polarization recovered signal, wherein in performing the polarization recovery, a polarization state of the polarization recovered signal is aligned with a principal axis of polarization of adaptive equalization; and a second equalizing unit 303 configured to perform adaptive equalization processing on the polarization recovered signal.

In the embodiment of this disclosure, the second polarization estimating unit 301 performs polarization estimation according to the received signal to obtain the estimated polarization rotation. An existing method, or a method described in the embodiment of this disclosure, may be used for the polarization estimation.

In the embodiment of this disclosure, the second equalizing unit 303 performs adaptive equalization processing on the polarization recovered signal by using an existing method, that is, the second equalizing unit 303 may use an existing AEQ module.

Structures of the second polarization estimating unit 301 and the second polarization recovering unit 302 and a method for performing polarization recovery shall be described below in detail.

In the embodiment of this disclosure, the structure of the second polarization estimating unit 301 is similar to that of the first polarization estimating unit 202, which shall be described together.

Figure 4:
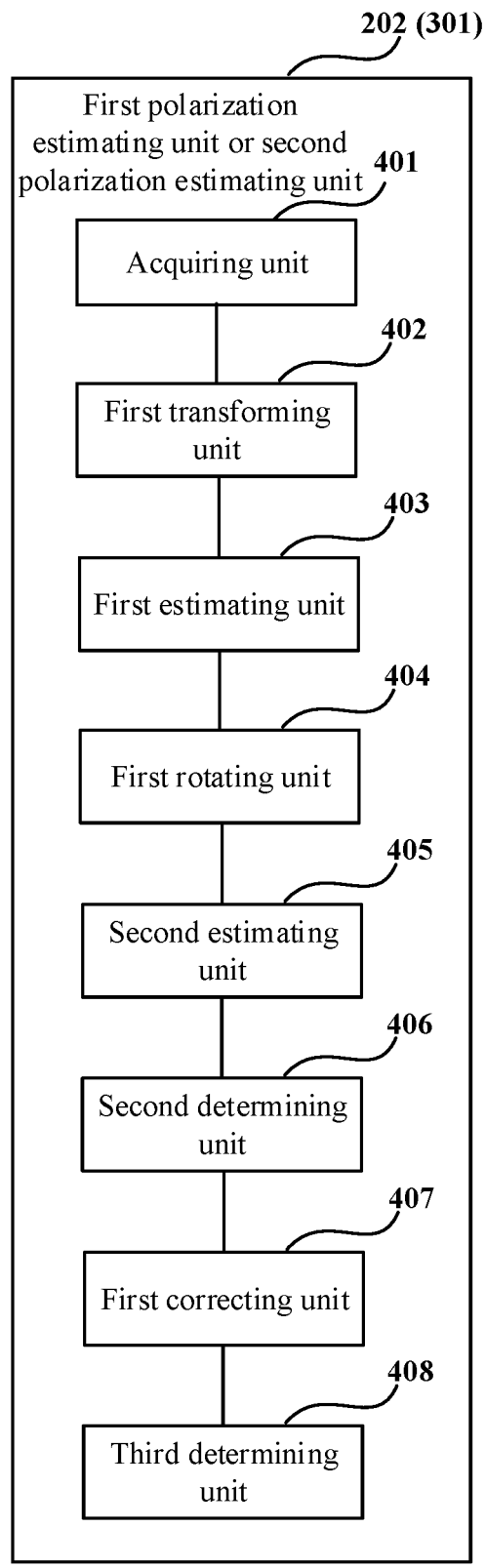
FIG. 4 is a schematic diagram of the first polarization estimating unit or the second polarization estimating unit according to an embodiment of this disclosure.

FIG. 4 is a schematic diagram of the first polarization estimating unit or the second polarization estimating unit of Embodiment 1 of this disclosure. As shown in FIG. 4, the first polarization estimating unit 202 or the second polarization estimating unit 301 includes:

an acquiring unit 401 configured to obtain the received signal after a transmit signal is propagated via an optical link or the adaptive equalization processed signal, pilot signals being inserted in the transmit signal, and the pilot signals being located on a plane in a Stokes space;

a first transforming unit 402 configured to transform pilot signals in the received signal or the adaptive equalization processed signal from a Jones space into the Stokes space to obtain Stokes vectors of the pilot signals;

a first estimating unit 403 configured to estimate a normal vector recovery matrix according to the Stokes vectors of the pilot signal;

a first rotating unit 404 configured to rotate normal vectors of a pilot signal plane by using the normal vector recovery matrix to obtain Stokes vectors of the pilot signals with recovered normal vectors;

a second estimating unit 405 configured to estimate a compensation matrix according to the Stokes vectors of the pilot signals with recovered normal vectors;

a second determining unit 406 configured to determine a first polarization estimation matrix of the pilot signals according to the normal vector recovery matrix and the compensation matrix;

a first correcting unit 407 configured to determine and correct a phase jump introduced by polarization estimation according to the first polarization estimation matrix to obtain a corrected first polarization estimation matrix; and a third determining unit 408 configured to obtain a second polarization estimation matrix of a data signal in the transmit signal according to the corrected first polarization estimation matrix.

Figure 5:
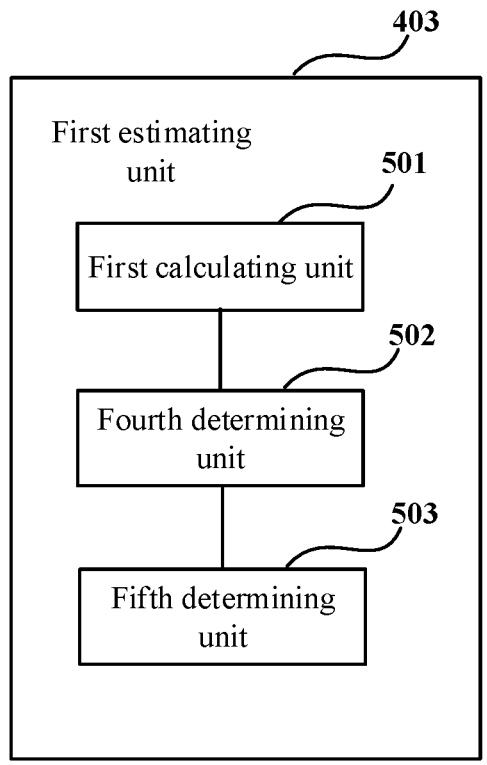
FIG. 5 is a schematic diagram of the first estimating unit according to an embodiment of this disclosure.

FIG. 5 is a schematic diagram of the first estimating unit of Embodiment 1 of this disclosure. As shown in FIG. 5, the first estimating unit 403 includes:

a first calculating unit 501 configured to perform cross-product and normalization on Stokes vectors of at least one pair of adjacent two types of pilot signals to obtain a planar normal vector;

a fourth determining unit 502 configured to obtain a rotational axis and a rotational angle of the normal vector according to a unit vector and the planar normal vector; and a fifth determining unit 503 configured to determine the normal vector recovery matrix according to the rotational axis and rotational angle of the normal vector.

Figure 6:
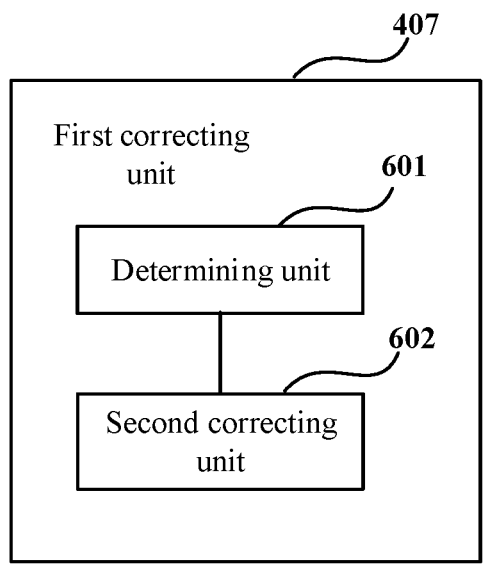
FIG. 6 is a schematic diagram of the first correcting unit according to an embodiment of this disclosure.

FIG. 6 is a schematic diagram of the first correcting unit of Embodiment 1 of this disclosure. As shown in FIG. 6, the first correcting unit 407 includes:

a determining unit 601 configured to determine whether a phase jump occurs according to a first polarization estimation matrix estimated currently and a first polarization estimation matrix estimated previously; and a second correcting unit 602 configured to correct the first polarization estimation matrix estimated currently by using a correction matrix in a case where the phase jump occurs, to obtain a corrected first polarization estimation matrix.

A particular process of performing polarization estimation by the second polarization estimating unit 301 and the first polarization estimating unit 202 shall be exemplarily described below.

In the embodiment of this disclosure, the transmit signal is transmitted by a transmitter of the communication system, and a pilot signal is inserted into the transmit signal, which may also be referred to as a pilot symbol (PS).

In the embodiment of this disclosure, the pilot signal may be various types of pilot signals. For example, the pilot signal is a pilot signal of dual-polarization (DP) quadrature phase shift keying (QPSK). The pilot signal of the DP-QPSK type may be expressed in a Jones space as:

$$\begin{bmatrix} E_x(t) \\ E_y(t) \end{bmatrix} = \frac{1}{\sqrt{2}} \begin{bmatrix} e^{j\varphi_x(t)} \\ e^{j\varphi_y(t)} \end{bmatrix} = \frac{1}{\sqrt{2}} \begin{bmatrix} e^{j(k_x(t)\frac{\pi}{2}-\frac{\pi}{4})} \\ e^{j(k_y(t)\frac{\pi}{2}-\frac{\pi}{4})} \end{bmatrix}, \quad (1)$$

$$k_{x,y} \in [1, 2, 3, 4];$$

where, t denotes the time, and $k_{x,y}$ corresponds to 4 QPSK constellation points in two polarization states.

A formula for transforming the pilot signal from the Jones space to the Stokes space is:

$$S(t) = \begin{bmatrix} S_0(t) \\ S_1(t) \\ S_2(t) \\ S_3(t) \end{bmatrix} = \begin{bmatrix} E_x(t)E_x^*(t) + E_y(t)E_y^*(t) \\ E_x(t)E_x^*(t) - E_y(t)E_y^*(t) \\ E_x(t)E_y^*(t) + E_y(t)E_x^*(t) \\ j(E_x(t)E_y^*(t) - E_y(t)E_x^*(t)) \end{bmatrix}; \quad (2)$$

where, $S_0$ is signal power, $S_1$, $S_2$ and $S_3$ are three-dimensional coordinates of a signal in the Stokes space.

Putting formula (1) into formula (2) may obtain a Stokes vector of the transmitted pilot signal:

$$S_{T,k}(t) = \begin{bmatrix} S_{0,T,k}(t) \\ S_{1,T,k}(t) \\ S_{2,T,k}(t) \\ S_{3,T,k}(t) \end{bmatrix} = \begin{bmatrix} 1 \\ 0 \\ \cos\left(k(t)\frac{\pi}{2} - \frac{\pi}{2}\right) \\ \sin\left(k(t)\frac{\pi}{2} - \frac{\pi}{2}\right) \end{bmatrix}, \quad (3)$$

$$k \in [1, 2, 3, 4];$$

where, k denotes the 4 types of pilot signals in the Stokes space.

Figure 7:
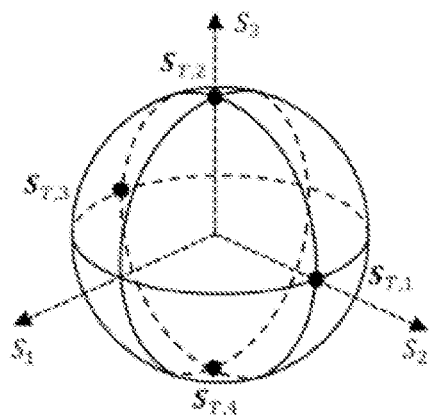
FIG. 7 is a schematic diagram of the Stokes vector of the transmitted pilot signal according to an embodiment of this disclosure.

FIG. 7 is a schematic diagram of the Stokes vector of the transmitted pilot signal in Embodiment 1 of this disclosure. As shown in FIG. 7, the four types of pilot signals are four intersections of a Poincare sphere surface and an S2 axis and an S3 axis, and are located in the same plane in the Stokes space.

In the embodiment of this disclosure, the acquiring unit 401 receives the received signal obtained after the transmit signal is propagated via the optical link.

As the pilot signal is affected by rotation of state of polarization (RSOP) and amplified spontaneous emission (ASE) noises during transmission, the signal is coherently received at the receiver end. For example, the received signal may be expressed as:

$$\begin{bmatrix} R_x(t) \\ R_y(t) \end{bmatrix} = T(t) \begin{bmatrix} E_x(t) \\ E_y(t) \end{bmatrix} e^{j\Delta\omega t} e^{j\varphi(t)} + n(t); \quad (4)$$

where, $\Delta\omega$ is a frequency offset between an optical carrier and a receiver optical local oscillator (LO), $\varphi(t)$ is a phase noise, n(t) is an ASE noise, and T(t) is a total link response containing the RSOP.

In the embodiment of this disclosure, the pilot signal in the received signal is transformed from the Jones space to the Stokes space to obtain the Stokes vector of the pilot signal.

For example, putting formula (4) into formula (2) may obtain the Stokes vector of the pilot signal:

$$S_{R,k}(t) = \begin{bmatrix} S_{0,R,k}(t) \\ S_{1,R,k}(t) \\ S_{2,R,k}(t) \\ S_{3,R,k}(t) \end{bmatrix}, \quad (5)$$

$$k \in [1, 2, 3, 4];$$

where, k denotes four types of pilot signals in the Stokes space.

In this way, effects of the frequency offset and the phase noise may be eliminated.

Figure 8:
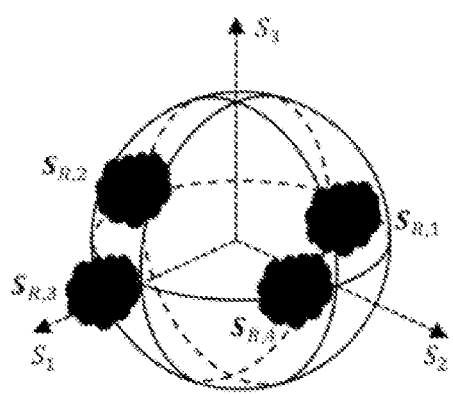
FIG. 8 is a schematic diagram of the Stokes vector of the received pilot signal according to an embodiment of this disclosure.

FIG. 8 is a schematic diagram of the Stokes vector of the received pilot signal of Embodiment 1 of this disclosure. As shown in FIG. 8, on the one hand, due to the effect of the RSOP, the received pilot signal will be offset from its original position in the Stokes space; and on the other hand, due to the effect of the ASE, the received pilot signal will be dispersive.

In the embodiment of this disclosure, classification averaging is performed on the Stokes vector of the pilot signal, so as to eliminate the effect of the ASE noise.

For example, the Stokes vector of the four types of pilot signals after the classification averaging are:

$$\overline{S_{R,k}}(t) = \begin{bmatrix} \overline{S_{1,R,k}}(t) \\ \overline{S_{2,R,k}}(t) \\ \overline{S_{3,R,k}}(t) \end{bmatrix} = \begin{bmatrix} \frac{1}{T}\sum_{t-T/2}^{t+T/2} S_{1,R,k}(t) \\ \frac{1}{T}\sum_{t-T/2}^{t+T/2} S_{2,R,k}(t) \\ \frac{1}{T}\sum_{t-T/2}^{t+T/2} S_{3,R,k}(t) \end{bmatrix}, \quad (6)$$

$$k \in [1, 2, 3, 4];$$

where, T is an average time.

Figure 9:
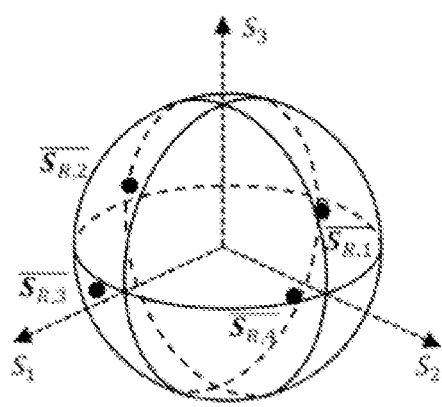
FIG. 9 is a schematic diagram of the classification averaged pilot signal according to an embodiment of this disclosure.

FIG. 9 is a schematic diagram of the classification averaged pilot signal of Embodiment 1 of this disclosure. As shown in FIG. 9, a Stokes vector $\overline{S_{R,k}}$ of the pilot signals after being classification averaged is obtained.

Figure 10:
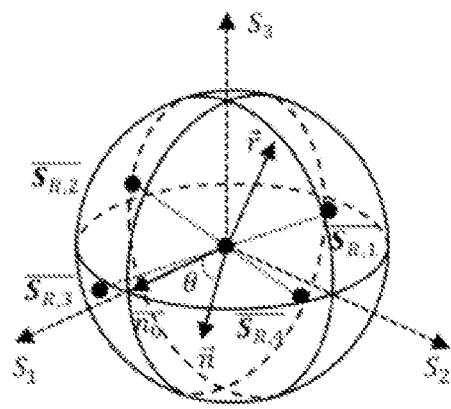
FIG. 10 is a schematic diagram of the normal vector estimation according to an embodiment of this disclosure.
Figure 11:
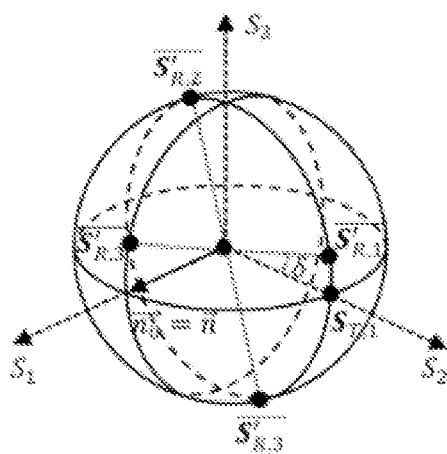
FIG. 11 is a schematic diagram of the four types of pilot signals recovered to the S2-S3 plane according to an embodiment of this disclosure.

FIG. 10 is a schematic diagram of the normal vector estimation of Embodiment 1 of this disclosure, and FIG. 11 is a schematic diagram of the four types of pilot signals recovered to the S2-S3 plane of Embodiment 1 of this disclosure.

In the embodiment of this disclosure, a plane normal vector of adjacent two types of pilot signals, such as first type of pilot signals and second type of pilot signals, may be obtained through cross-product and normalization processing:

$$\vec{n}(t) = \frac{\vec{s'_{R,1}}(t) \times \vec{s'_{R,2}}(t)}{|\vec{s'_{R,1}}(t) \times \vec{s'_{R,2}}(t)|} = \begin{bmatrix} n_1(t) \\ n_2(t) \\ n_3(t) \end{bmatrix}. \quad (7)$$

Here, a direction of the plane normal vector of the pilot signal is completely determined by an order of cross-product of the pilot signals, thereby solving a problem of direction ambiguity of estimating the normal vector based on plane fitting.

In the embodiment of this disclosure, the normal vector may be obtained through cross-product and normalization processing according to a pair of adjacent two types of pilot signals, or respective normal vectors may be obtained through cross-product according to multiple pairs of adjacent two types of pilot signals, and then the normal vector is obtained through averaging and normalization processing.

A rotation axis and rotation angle of the normal vector are obtained according a unit vector $\vec{n_0} = [1, 0, 0]^T$ and the plane normal vector $\vec{n}(t)$:

$$\vec{r}(t) = \frac{\vec{n_0} \times \vec{n}(t)}{|\vec{n_0} \times \vec{n}(t)|}, \quad (8)$$

$$\theta(t) = \arccos\left(\frac{\vec{n_0} \cdot \vec{n}(t)}{|\vec{n_0}||\vec{n}(t)|}\right). \quad (9)$$

Thus, a rotation matrix of the normal vector in the Jones space is obtained:

$$U_{normal}(t) = \cos\left(\frac{\theta(t)}{2}\right)I + j\sin\left(\frac{\theta(t)}{2}\right)(\vec{r}(t) \cdot \sigma); \quad (10)$$

where, I is a unit matrix, and σ is a Pauli matrix.

A relationship of transformation of the polarization rotation in the Jones space and the Stokes space is:

$$U = \begin{bmatrix} u_1 & u_2 \\ -u_2^* & u_1^* \end{bmatrix} \rightarrow R = \begin{bmatrix} |u_1|^2 - |u_2|^2 & -2\text{Re}(u_1 u_2^*) & -2\text{Im}(u_1 u_2^*) \\ 2\text{Re}(u_1 u_2) & \text{Re}(u_1^2 - u_2^2) & \text{Im}(u_1^2 + u_2^2) \\ -2\text{Im}(u_1 u_2) & -\text{Im}(u_1^2 - u_2^2) & \text{Re}(u_1^2 + u_2^2) \end{bmatrix}. \quad (11)$$

Putting formula (10) into formula (11) may obtain its rotation matrix $R_{normal}(t)$ in the Stokes space, and $$\overline{S_{R,k}''}(t) = \left[\overline{S_{1,R,k}''}(t), \overline{S_{2,R,k}''}(t), \overline{S_{3,R,k}''}(t)\right]^T \quad (12)$$

obtained by rotating the pilot signal. And at this moment, the plane normal vector coincides with the unit vector $\vec{n_0}=[1, 0, 0]^T$, and the four types of pilot signals are recovered into the S2-S3 plane, as shown in FIG. 11.

A rotation angle and a corresponding rotation matrix of the first type of pilot signal in the S2-S3 plane may be calculated according to a relationship between a current Stokes vector $\overline{S''_{R,1}}(t)$ of the first type of pilot signal and a transmitted Stokes vector $S_{T,1}(t)$ in the S2-S3 plane:

$$\delta(t) = \arctan\left(\frac{\overline{S_{3,R,1}''}(t)}{\overline{S_{2,R,1}''}(t)}\right), \quad (12)$$

$$U_{retarder}(t) = \begin{bmatrix} e^{j\frac{\delta(t)}{2}} & 0 \\ 0 & e^{-j\frac{\delta(t)}{2}} \end{bmatrix}. \quad (13)$$

Thus, a first polarization estimation matrix of the pilot signal may be obtained:

$$U_{RSOP}(t) = U_{retarder}(t)U_{normal}(t) \quad (14).$$

Compared with the polarization demultiplexing method based on normal vector recovery, the above processing for residual retarder may completely compensate for the polarization rotation in the link, and eliminate signal constellation rotation and the phase noise introduced by the residual retarder, thereby eliminating an effect of polarization recovery on subsequent carrier phase recovery (CPR).

In the embodiment of this disclosure, it can be seen from formula (11) that a period of the polarization rotation in the Stokes space is twice of that in the Jones space, hence, performing polarization estimation in the Stokes space may possibly introduce a phase jump in the Jones space, that is, $$U_{RSOP}(t) = \begin{bmatrix} e^{-j\frac{\varphi}{2}} & 0 \\ 0 & e^{j\frac{\varphi}{2}} \end{bmatrix} U_{RSOP}(t), \varphi = 0 \text{ or } 2\pi. \quad (15)$$

The phase jump will cause that the first polarization estimation matrix is discontinuous. As the polarization rotation is a continuous physical process, polarization estimation should also be continuous. Assuming that a last time of polarization estimation was correct, a phase jump may occur in current polarization estimation. In this case, the first polarization estimation matrix may be expressed as:

$$U_{RSOP}(t - \Delta t) = \quad (16)$$

$$\begin{bmatrix} u_1(t-\Delta t) & u_2(t-\Delta t) \\ -u_2^*(t-\Delta t) & u_1^*(t-\Delta t) \end{bmatrix}^{-1} = \begin{bmatrix} u_1^*(t-\Delta t) & -u_2(t-\Delta t) \\ u_2^*(t-\Delta t) & u_1(t-\Delta t) \end{bmatrix},$$

$$U_{RSOP}(t) = \begin{bmatrix} e^{-j\frac{\varphi}{2}} & 0 \\ 0 & e^{j\frac{\varphi}{2}} \end{bmatrix} \begin{bmatrix} u_1(t) & u_2(t) \\ -u_2^*(t) & u_1^*(t) \end{bmatrix}^{-1} = \begin{bmatrix} u_1^*(t)e^{-j\frac{\varphi}{2}} & -u_2(t)e^{-j\frac{\varphi}{2}} \\ u_2^*(t)e^{j\frac{\varphi}{2}} & u_1(t)e^{j\frac{\varphi}{2}} \end{bmatrix}. \quad (17)$$

Whether a phase jump occurs may be determined by calculating elements in the current first polarization estimation matrix and the last time of first polarization estimation matrix, which is as follows:

$$\Delta = U_{RSOP,11}(t) \cdot conj(U_{RSOP,11}(t-\Delta t)) + \quad (18)$$
$$U_{RSOP,12}(t) \cdot conj(U_{RSOP,12}(t-\Delta t)) =$$
$$u_1^*(t)e^{-j\frac{\varphi}{2}} \cdot conj(u_1^*(t-\Delta t)) - u_2(t)e^{-j\frac{\varphi}{2}} \cdot conj(-u_2(t-\Delta t)) \approx$$
$$(|u_1^*(t)|^2 + |u_2(t)|^2)e^{-j\frac{\varphi}{2}} \approx \pm 1;$$

where, $U_{RSOP,11}$ and $U_{RSOP,12}$ respectively denote elements in line 1, column 1 and line 1, column 2, in the first polarization estimation matrix. When $\Delta \approx 1$, a phase jump does not occur, and the first polarization estimation matrix is continuous; and when $\Delta \approx -1$, a phase jump occurs, and the first polarization estimation matrix is discontinuous. And in this case, the first polarization estimation matrix needs to be corrected, and a correction matrix is:

$$U_{phase\ jump} = \begin{bmatrix} e^{j\pi} & 0 \\ 0 & e^{-j\pi} \end{bmatrix}. \quad (19)$$

And the corrected first polarization estimation matrix is:

$$U_{RSOP}(t) = \begin{cases} U_{RSOP}(t) & \Delta \approx 1 \\ U_{phase\ jump}U_{RSOP}(t) & \Delta \approx -1 \end{cases}. \quad (20)$$

After obtaining the corrected first polarization change matrix, the third determining unit obtains the second polarization estimation matrix of the data signal in the transmit signal according to the corrected first polarization estimation matrix.

Figure 12:
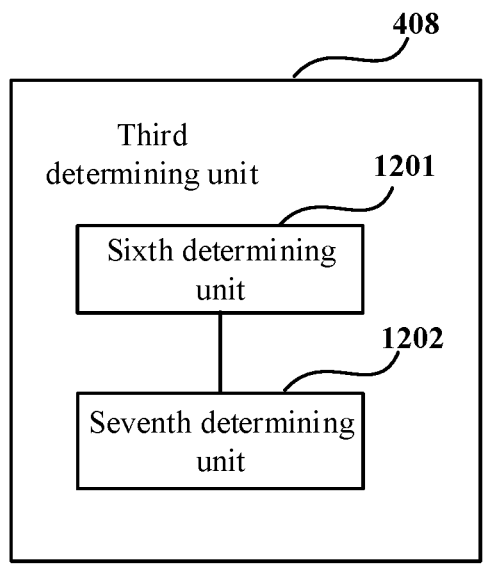
FIG. 12 is a schematic diagram of the third determining unit according to an embodiment of this disclosure.

FIG. 12 is a schematic diagram of the third determining unit of Embodiment 1 of this disclosure. As shown in FIG. 12, the third determining unit 408 includes:

a sixth determining unit 1201 configured to determine a second polarization change matrix of a data signal between the adjacent pilot signals according to first polarization change matrices of the corrected adjacent pilot signals; or a seventh determining unit 1202 configured to determine a second polarization change matrix of a data signal between the adjacent pilot signals according to a first polarization change matrix of a previous pilot signal in the corrected adjacent pilot signals.

For example, the sixth determining unit 1201 interpolates the elements of the first polarization change matrices of two adjacent pilot signals to obtain elements of a second polarization change matrix of the data signal between the adjacent pilot signals, thereby obtaining a complete second polarization change matrix of the data signal between the adjacent pilot signals.

For example, the seventh determining unit 1202 directly uses a first polarization change matrix of the former pilot signal in the adjacent pilot signals as the second polarization change matrix of the data signal between the adjacent pilot signals.

In the embodiment of this disclosure, both the first polarization recovering unit 203 and the second polarization recovering unit 302 perform polarization recovery according to the estimated polarization rotation. The estimated polarization rotation is, for example, denoted by the second polarization change matrix.

For example, the signal obtained after the polarization recovery is performed according to the second polarization change matrix may be expressed as:

$$\begin{bmatrix} R'_x(t) \\ R'_y(t) \end{bmatrix} = U_{RSOP}(t) \begin{bmatrix} R_x(t) \\ R_y(t) \end{bmatrix} = \quad (21)$$

$$U_{RSOP}(t) \left\{ T(t) \begin{bmatrix} E_x(t) \\ E_y(t) \end{bmatrix} e^{j\Delta\omega t} e^{j\varphi(t)} + n(t) \right\} = \begin{bmatrix} E_x(t) \\ E_y(t) \end{bmatrix} e^{j\Delta\omega t} e^{j\varphi(t)} + n'(t).$$

Figure 13:
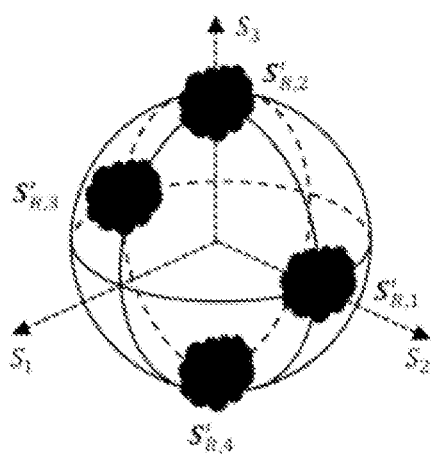
FIG. 13 is a schematic diagram of the Stokes vector of the recovered pilot signal according to an embodiment of this disclosure.

At this moment, the polarization rotation in the link is completely recovered. FIG. 13 is a schematic diagram of the Stokes vector of the recovered pilot signal of Embodiment 1 of this disclosure.

A particular structure and functions of the second polarization recovering unit 302 shall be described below.

Figure 14:
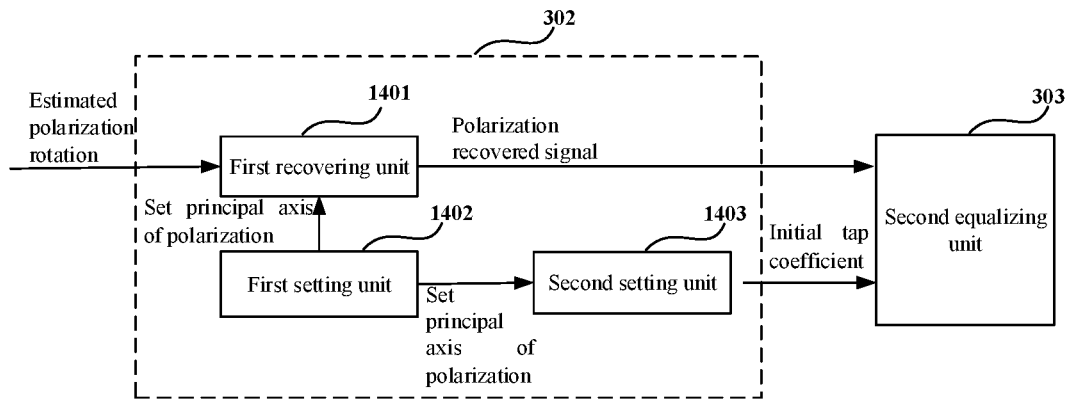
FIG. 14 is a schematic diagram of the second polarization recovering unit according to an embodiment of this disclosure.

FIG. 14 is a schematic diagram of the second polarization recovering unit of Embodiment 1 of this disclosure. As shown in FIG. 14, the second polarization recovering unit 302 includes:

a first recovering unit 1401 configured to perform polarization recovery based on a principal axis of polarization of polarization recovery and the estimated polarization rotation;

a first setting unit 1402 configured to set the principal axis of polarization of polarization recovery; and a second setting unit 1403 configured to set an initial tap coefficient of adaptive equalization to make the principal axis of polarization of adaptive equalization be aligned with the principal axis of polarization of polarization recovery.

In this way, the polarization recovery is aligned with the principal axis of polarization of the adaptive equalization, so that the polarization recovery has no adverse effect on the adaptive equalization. In the embodiment of this disclosure, the first setting unit 1402 is configured to set the principal axis of polarization of polarization recovery. For example, the set principal axis of polarization may be expressed by the following formula (22):

$$U_{axes} = \begin{bmatrix} e^{j\alpha}\cos(\kappa) & -e^{j\beta}\sin(\kappa) \\ e^{-j\beta}\sin(\kappa) & e^{-j\alpha}\cos(\kappa) \end{bmatrix}; \quad (22)$$

where, α, β and κ are rotation angles to which a direction of the set principal axis of polarization corresponds. In this case, a total polarization recovery matrix may be expressed as:

$$U_{RSOP}(t) = \begin{cases} U_{axes}U_{RSOP}(t) & \Delta \approx 1 \\ U_{axes}U_{phase\ jump}U_{RSOP}(t) & \Delta \approx -1 \end{cases}. \quad (23)$$

An initial value of a center tap coefficient of the adaptive equalization may be expressed as:

$$M_{AEQ} = U_{axes}^{-1} = \begin{bmatrix} e^{j\alpha}\cos(\kappa) & -e^{j\beta}\sin(\kappa) \\ e^{-j\beta}\sin(\kappa) & e^{-j\alpha}\cos(\kappa) \end{bmatrix}^{-1}; \quad (24)$$

where, initial values of non-center tap coefficients are all 0.

Figure 15:
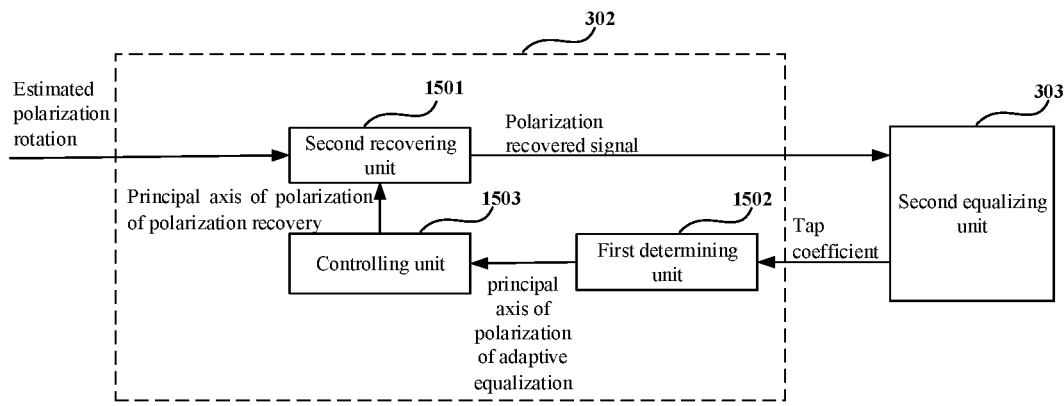
FIG. 15 is another schematic diagram of the second polarization recovering unit according to an embodiment of this disclosure.

FIG. 15 is another schematic diagram of the second polarization recovering unit of Embodiment 1 of this disclosure. As shown in FIG. 15, the second polarization recovering unit 302 includes:

a second recovering unit 1501 configured to perform polarization recovery based on a principal axis of polarization of polarization recovery and the estimated polarization rotation;

a first determining unit 1502 configured to determine the principal axis of polarization of adaptive equalization according to a tap coefficient of adaptive equalization; and a controlling unit 1503 configured to control the principal axis of polarization of polarization recovery to make the principal axis of polarization of polarization recovery be aligned with the principal axis of polarization of adaptive equalization.

In this way, the polarization recovery is aligned with the principal axis of polarization of the adaptive equalization, so that the polarization recovery has no adverse effect on the adaptive equalization. In the embodiment of this disclosure, the response of the adaptive equalization may be expressed as:

$$M_{AEQ} = \begin{bmatrix} w_{hh} & w_{hv} \\ w_{vh} & w_{vv} \end{bmatrix}; \quad (25)$$

where, $w_{hh}$, $w_{hv}$, $w_{vh}$ and $w_{vv}$ denote tap coefficients of an adaptive equalization filter. The tap coefficients of the filters are summed up to obtain a zero-frequency response, and inversion thereof is calculated to obtain a 2×2 complex matrix to which a principal axis of polarization the adaptive equalization corresponds, which is expressed as:

$$U_{axes} = \begin{bmatrix} W_{hh} & W_{hv} \\ W_{vh} & W_{vv} \end{bmatrix}^{-1} = \begin{bmatrix} \sum w_{hh} & \sum w_{hv} \\ \sum w_{vh} & \sum w_{vv} \end{bmatrix}^{-1}. \quad (26)$$

In this case, the total polarization recovery matrix may be expressed as:

$$U_{RSOP}(t) = \begin{cases} U_{axes}U_{RSOP}(t) & \Delta \approx 1 \\ U_{axes}U_{phase\ jump}U_{RSOP}(t) & \Delta \approx -1 \end{cases}. \quad (27)$$

In the embodiment of this disclosure, the second recovering unit 1501 may perform polarization recovery based on the total polarization recovery matrix. In addition, the first recovering unit 1401 may obtain a total polarization recovery matrix by using a similar method, so as to perform polarization recovery.

It can be seen from the above embodiment that in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

Embodiment 2

The embodiment of this disclosure provides an optical receiver, including the polarization recovery apparatus as described in Embodiment 1. Reference may be made to Embodiment 1 for a particular structure and functions of the polarization recovery apparatus, which shall not be described herein any further.

Figure 16:
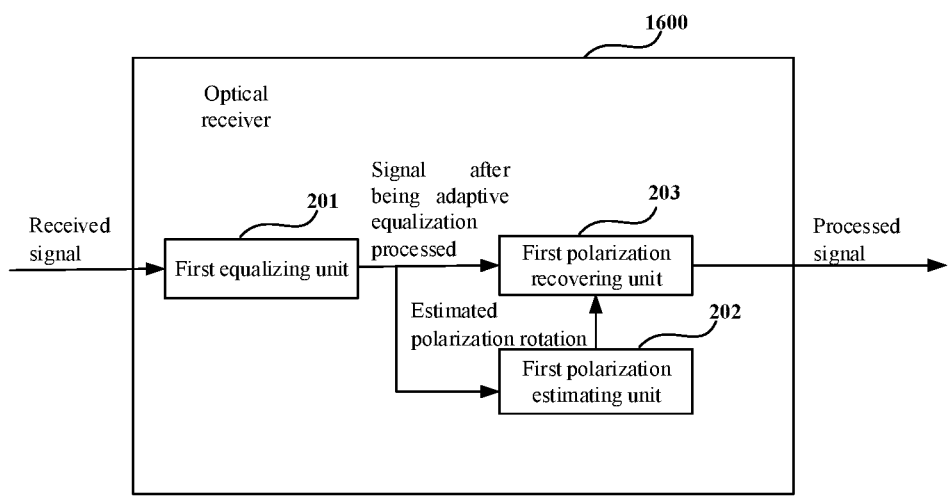
FIG. 16 is a block diagram of a systematic structure of the optical receiver according to an embodiment of this disclosure.

FIG. 16 is a block diagram of a systematic structure of the optical receiver of Embodiment 2 of this disclosure. As shown in FIG. 16, an optical receiver 1600 includes a first equalizing unit 201, a first polarization estimating unit 202 and a first polarization recovering unit 203. The first equalizing unit 201 performs adaptive equalization processing on a received signal to obtain an adaptive equalization processed signal; the first polarization estimating unit 202 performs polarization estimation according to the adaptive equalization processed signal to obtain estimated polarization rotation; and the first polarization recovering unit 203 performs polarization recovery according to the estimated polarization rotation and outputs the processed signal, wherein in performing the polarization recovery, the polarization state of the received signal, after adaptive equalization processing being performed, is aligned with a principal axis of polarization of the optical receiver.

FIG. 17 is another block diagram of the systematic structure of the optical receiver of Embodiment 2 of this disclosure. As shown in FIG. 17, an optical receiver 1700 includes a second polarization estimating unit 301, a second polarization recovering unit 302 and a second equalizing unit 303. The second polarization estimating unit 301 performs polarization estimation according to the received signal to obtain estimated polarization rotation; the second polarization recovering unit 302 performs polarization recovery on the received signal according to the estimated polarization rotation to obtained a polarization recovered signal, wherein in performing the polarization recovery, a polarization state of the polarization recovered signal is aligned with a principal axis of polarization of adaptive equalization; and the second equalizing unit 303 performs adaptive equalization processing on the polarization recovered signal and outputs the processed signal.

In the second polarization recovering unit 302, as shown in FIG. 17, the first setting unit 1402 sets the principal axis of polarization of polarization recovery, and the second setting unit 1403 sets an initial tap coefficient of adaptive equalization to make the principal axis of polarization of adaptive equalization be aligned with the principal axis of polarization of polarization recovery. In addition, the first recovering unit 1401 performs polarization recovery based on a principal axis of polarization of polarization recovery and the estimated polarization rotation.

FIG. 18 is a further block diagram of the systematic structure of the optical receiver of Embodiment 2 of this disclosure. As shown in FIG. 18, an optical receiver 1800 includes a second polarization estimating unit 301, a second polarization recovering unit 302 and a second equalizing unit 303. The second polarization estimating unit 301 performs polarization estimation according to the received signal to obtain estimated polarization rotation; the second polarization recovering unit 302 performs polarization recovery on the received signal according to the estimated polarization rotation to obtained a polarization recovered signal, wherein in performing the polarization recovery, a polarization state of the polarization recovered signal is aligned with a principal axis of polarization of adaptive equalization; and the second equalizing unit 303 performs adaptive equalization processing on the polarization recovered signal and outputs the processed signal.

In the second polarization recovering unit 302, as shown in FIG. 18, the first determining unit 1502 determines the principal axis of polarization of adaptive equalization according to a tap coefficient of adaptive equalization, and the controlling unit 1503 controls the principal axis of polarization of polarization recovery to make the principal axis of polarization of polarization recovery be aligned with the principal axis of polarization of adaptive equalization. In addition, the second recovering unit 1501 performs polarization recovery based on a principal axis of polarization of polarization recovery and the estimated polarization rotation.

In the embodiment of this disclosure, the optical receivers 1600, 1700 and 1800 do not necessarily include all the components shown in FIGS. 16, 17 and 18; and furthermore, the optical receivers 1600, 1700 and 1800 may include components not shown in FIGS. 16, 17 and 18, and reference may be made to related technologies for details.

In the embodiment of this disclosure, functions of the polarization recovery apparatus may be executed by a processor of the optical receiver; for example, they may be executed by a digital signal processor (DSP) of the receiver.

It can be seen from the above embodiment that in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

Embodiment 3

The embodiment of this disclosure provides a polarization recovery method, corresponding to the polarization recovery apparatus as described in Embodiment 1.

FIG. 19 is a schematic diagram of the polarization recovery method of Embodiment 3 of this disclosure. As shown in FIG. 19, the method includes:

Operation 1901: adaptive equalization processing and polarization recovery is performed on a received signal;

wherein a polarization state of the received signal, after adaptive equalization processing and polarization recovery being performed, is aligned with a principal axis of polarization of an optical receiver.

In this embodiment, reference may be made to implementations of the units in Embodiment 1 for execution of operation 1901, which shall not be described herein any further.

It can be seen from the above embodiment that in a case of joint processing of a polarization demultiplexing module and an AEQ module, effects of adaptive equalization processing and polarization recovery on polarization states are simultaneously taken into account, so that polarization states of a received signal that is jointly processed by the polarization demultiplexing module and the AEQ module are able to be aligned with a principal axis of polarization of an optical receiver, thereby ensuring accuracy of polarization demultiplexing of the received signal.

An embodiment of this disclosure provides a computer readable program, which, when executed in a polarization recovery apparatus or an optical receiver, will cause a computer to carry out the polarization recovery method as described in Embodiment 3 in the polarization recovery apparatus or the optical receiver.

An embodiment of this disclosure provides a computer storage medium, including a computer readable program, which will cause a computer to carry out the polarization recovery method as described in Embodiment 3 in a polarization recovery apparatus or an optical receiver.

Carrying out the polarization recovery method in the polarization recovery apparatus or the optical receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the operations shown in FIG. 19. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further disclosed in the embodiments of this disclosure.

SUPPLEMENTS

1. A polarization recovery method, wherein the method includes:

performing adaptive equalization processing and polarization recovery on a received signal;

wherein a polarization state of the received signal after being performed adaptive equalization processing and polarization recovery is aligned with a principal axis of polarization of an optical receiver.

2. The method according to supplement 1, wherein, the performing adaptive equalization processing and polarization recovery on a received signal includes:

performing adaptive equalization processing on the received signal to obtain an adaptive equalization processed signal;

performing polarization estimation according to the adaptive equalization processed signal to obtain estimated polarization rotation; and performing polarization recovery according to the estimated polarization rotation, wherein in performing the polarization recovery, the polarization state of the received signal after being performed adaptive equalization processing is aligned with the principal axis of polarization of the optical receiver.

3. The method according to supplement 1, wherein, the performing adaptive equalization processing and polarization recovery on a received signal includes:

performing polarization estimation according to the received signal to obtain estimated polarization rotation;

performing polarization recovery on the received signal according to the estimated polarization rotation to obtained a polarization recovered signal, wherein in performing the polarization recovery, a polarization state of the polarization recovered signal is aligned with a principal axis of polarization of adaptive equalization; and performing adaptive equalization processing on the polarization recovered signal.

4. The method according to supplement 3, wherein the performing polarization recovery on the received signal according to the estimated polarization rotation includes:

performing polarization recovery based on a principal axis of polarization of polarization recovery and the estimated polarization rotation;

setting the principal axis of polarization of polarization recovery; and setting an initial tap coefficient of adaptive equalization to make the principal axis of polarization of adaptive equalization be aligned with the principal axis of polarization of polarization recovery.

5. The method according to supplement 3, wherein the performing polarization recovery on the received signal according to the estimated polarization rotation includes:

performing polarization recovery based on a principal axis of polarization of polarization recovery and the estimated polarization rotation;

determining the principal axis of polarization of adaptive equalization according to a tap coefficient of adaptive equalization; and controlling the principal axis of polarization of polarization recovery to make the principal axis of polarization of polarization recovery be aligned with the principal axis of polarization of adaptive equalization.

6. The method according to supplement 2 or 3, wherein the polarization estimation includes:

obtaining the received signal after a transmit signal is propagated via an optical link or the adaptive equalization processed signal, pilot signals being inserted in the transmit signal, and the pilot signals being located on a plane in a Stokes space;

transforming pilot signals in the received signal or the adaptive equalization processed signal from a Jones space into the Stokes space to obtain Stokes vectors of the pilot signals;

estimating a normal vector recovery matrix according to the Stokes vectors of the pilot signal;

rotating normal vectors of a pilot signal plane by using the normal vector recovery matrix to obtain Stokes vectors of the pilot signals with recovered normal vectors;

estimating a compensation matrix according to the Stokes vectors of the pilot signals with recovered normal vectors;

determining a first polarization estimation matrix of the pilot signals according to the normal vector recovery matrix and the compensation matrix;

determining and correcting a phase jump introduced by polarization estimation according to the first polarization estimation matrix to obtain a corrected first polarization estimation matrix; and obtaining a second polarization estimation matrix of a data signal in the transmit signal according to the corrected first polarization estimation matrix.

7. The method according to supplement 6, wherein the estimating a normal vector recovery matrix according to the Stokes vectors of the pilot signal includes:

performing cross-product and normalization on Stokes vectors of at least one pair of adjacent two types of pilot signals to obtain a planar normal vector;

obtaining a rotational axis and a rotational angle of the normal vector according to a unit vector and the planar normal vector; and determining the normal vector recovery matrix according to the rotational axis and rotational angle of the normal vector.

8. The method according to supplement 6, wherein the determining and correcting a phase jump introduced by polarization estimation according to the first polarization estimation matrix to obtain a corrected first polarization estimation matrix includes:

determining whether a phase jump occurs according to a first polarization estimation matrix estimated currently and a first polarization estimation matrix estimated previously; and correcting the first polarization estimation matrix estimated currently by using a correction matrix in a case where the phase jump occurs, to obtain a corrected first polarization estimation matrix.

9. The method according to supplement 6, wherein the obtaining a second polarization estimation matrix of a data signal in the transmit signal according to the corrected first polarization estimation matrix includes:

determining a second polarization change matrix of a data signal between the adjacent pilot signals according to first polarization change matrices of the corrected adjacent pilot signals; or determining a second polarization change matrix of a data signal between the adjacent pilot signals according to a first polarization change matrix of a previous pilot signal in the corrected adjacent pilot signals.

What is claimed is:

1. An apparatus for polarization recovery, comprising:
a processor configured to:
perform adaptive equalization processing and polarization recovery on a received signal;
wherein a polarization state of the received signal, after the adaptive equalization processing and polarization recovery being performed, is aligned with a principal axis of polarization of an optical receiver, and
wherein the processor is further configured to:
perform the adaptive equalization processing on the received signal to obtain an adaptive equalization processed signal;
perform polarization estimation according to the adaptive equalization processed signal to obtain estimated polarization rotation; and
perform the polarization recovery according to the estimated polarization rotation, wherein in the performing of the polarization recovery, the polarization state of the received signal, after the adaptive equalization processing being performed, is aligned with the principal axis of polarization of the optical receiver.

2. The apparatus according to claim 1, wherein the performing of the polarization estimation comprises:
obtaining the received signal after a transmit signal is propagated via an optical link or the adaptive equalization processed signal, pilot signals being inserted in the transmit signal, and the pilot signals being located on a plane in a Stokes space;
transforming pilot signals in the received signal or the adaptive equalization processed signal from a Jones space into the Stokes space to obtain Stokes vectors of the pilot signals;
estimating a normal vector recovery matrix according to the Stokes vectors of the pilot signal;
rotating normal vectors of a pilot signal plane by using the normal vector recovery matrix to obtain Stokes vectors of the pilot signals with recovered normal vectors;
estimating a compensation matrix according to the Stokes vectors of the pilot signals with recovered normal vectors;
determining a first polarization estimation matrix of the pilot signals according to the normal vector recovery matrix and the compensation matrix;
determining and correcting a phase jump introduced by polarization estimation according to the first polarization estimation matrix to obtain a corrected first polarization estimation matrix; and
obtaining a second polarization estimation matrix of a data signal in the transmit signal according to the corrected first polarization estimation matrix.

3. The apparatus according to claim 2, wherein the estimating of the normal vector recovery matrix comprises:
performing cross-product and normalization on Stokes vectors of at least one pair of adjacent two types of pilot signals to obtain a planar normal vector;

obtaining a rotational axis and a rotational angle of the normal vector according to a unit vector and the planar normal vector; and determining the normal vector recovery matrix according to the rotational axis and rotational angle of the normal vector.

4. The apparatus according to claim 2, wherein the determining and correcting of the phase jump comprises:

determining whether a phase jump occurs according to a first polarization estimation matrix estimated currently and a first polarization estimation matrix estimated previously; and correcting the first polarization estimation matrix estimated currently by using a correction matrix in a case where the phase jump occurs, to obtain a corrected first polarization estimation matrix.

5. The apparatus according to claim 2, wherein the obtaining the second polarization estimation matrix of the data signal comprises:

determining a second polarization change matrix of a data signal between adjacent pilot signals according to first polarization change matrices of corrected adjacent pilot signals; or determining a second polarization change matrix of a data signal between the adjacent pilot signals according to a first polarization change matrix of a previous pilot signal in the corrected adjacent pilot signals.

6. An optical receiver comprising the apparatus as claimed in claim 1.

7. An apparatus for polarization recovery, comprising:
a processor configured to:
perform adaptive equalization processing and polarization recovery on a received signal;
wherein a polarization state of the received signal, after the adaptive equalization processing and polarization recovery being performed, is aligned with a principal axis of polarization of an optical receiver, and
wherein the processor is further configured to:
perform polarization estimation according to the received signal to obtain estimated polarization rotation;
perform the polarization recovery on the received signal according to the estimated polarization rotation to obtain a polarization recovered signal, wherein in the performing of the polarization recovery, a polarization state of the polarization recovered signal is aligned with a principal axis of polarization of adaptive equalization; and
perform the adaptive equalization processing on the polarization recovered signal.

8. The apparatus according to claim 7, wherein the performing of the polarization recovery comprises:

performing polarization recovery based on a principal axis of polarization of polarization recovery and the estimated polarization rotation;

setting the principal axis of polarization of polarization recovery; and setting an initial tap coefficient of adaptive equalization to make the principal axis of polarization of adaptive equalization be aligned with the principal axis of polarization of polarization recovery.

9. The apparatus according to claim 7, wherein the performing of the polarization recovery comprises:

performing polarization recovery based on a principal axis of polarization of polarization recovery and the estimated polarization rotation;

determining the principal axis of polarization of adaptive equalization according to a tap coefficient of adaptive equalization; and controlling the principal axis of polarization of polarization recovery to make the principal axis of polarization of polarization recovery be aligned with the principal axis of polarization of adaptive equalization.

10. The apparatus according to claim 7, wherein the performing of the polarization estimation comprises:

obtaining the received signal after a transmit signal is propagated via an optical link or the adaptive equalization processed signal, pilot signals being inserted in the transmit signal, and the pilot signals being located on a plane in a Stokes space;

transforming pilot signals in the received signal or the adaptive equalization processed signal from a Jones space into the Stokes space to obtain Stokes vectors of the pilot signals;

estimating a normal vector recovery matrix according to the Stokes vectors of the pilot signal;

rotating normal vectors of a pilot signal plane by using the normal vector recovery matrix to obtain Stokes vectors of the pilot signals with recovered normal vectors;

estimating a compensation matrix according to the Stokes vectors of the pilot signals with recovered normal vectors;

determining a first polarization estimation matrix of the pilot signals according to the normal vector recovery matrix and the compensation matrix;

determining and correcting a phase jump introduced by polarization estimation according to the first polarization estimation matrix to obtain a corrected first polarization estimation matrix; and obtaining a second polarization estimation matrix of a data signal in the transmit signal according to the corrected first polarization estimation matrix.

11. An optical receiver comprising the apparatus as claimed in claim 7.

* * * * *